United States Patent [19]

Clark

[11] Patent Number: 5,776,044
[45] Date of Patent: Jul. 7, 1998

[54] CLOSABLE BAG AND METHOD OF MAKING SAME

[76] Inventor: Donald Clark, 1913 Woodholly Ct., Glendale, Calif. 91207

[21] Appl. No.: 458,491

[22] Filed: Aug. 7, 1995

Related U.S. Application Data

[62] Division of Ser. No. 198,601, Feb. 18, 1994, abandoned.
[51] Int. Cl.$^6$ ........................................................ B31B 1/90
[52] U.S. Cl. ........................ 493/215; 493/210; 493/381; 493/224; 493/346
[58] Field of Search ....................... 156/300, 301, 156/302, 579, 550, 551; 493/196, 197, 223, 224, 225, 235, 236, 239, 266, 346, 381, 210, 212–215, 927, 345, 380; 383/68, 84, 85, 86, 88, 89, 90

[56] References Cited

U.S. PATENT DOCUMENTS

| | | | |
|---|---|---|---|
| 1,903,839 | 4/1933 | Royal | 383/89 |
| 2,545,370 | 3/1951 | Mittelmann | 156/551 |
| 3,201,030 | 8/1965 | Pollack | 383/89 |
| 4,931,035 | 6/1990 | Schmidt | 493/381 |
| 5,215,797 | 6/1993 | Larsen | 383/90 |
| 5,273,608 | 12/1993 | Nath | 156/301 |
| 5,328,436 | 7/1994 | Larsen | 493/213 |

FOREIGN PATENT DOCUMENTS 756199 of 1956 United Kingdom ............... 493/212

*Primary Examiner*—Jack W. Lavinder
*Attorney, Agent, or Firm*—James E. Brunton, Esq.

[57] ABSTRACT

A method of making continuous rolls of a thin laminate composite that is ideally suited for the large scale production of reclosable bags which can be used for sealably packaging a wide variety of articles, including food products. The bags of the invention, after being opened, can quickly and easily be closed by rolling the open end downwardly upon itself in a manner to sealably deform one or more inelastic, malleable metal filaments which are encapsulated within at least one of the laminate side walls of the bag. The novel laminate composite material produced by the method of the invention comprises first and second thin layers of film between which one or more length of the thin malleable metal filaments are sealably encapsulated.

19 Claims, 5 Drawing Sheets

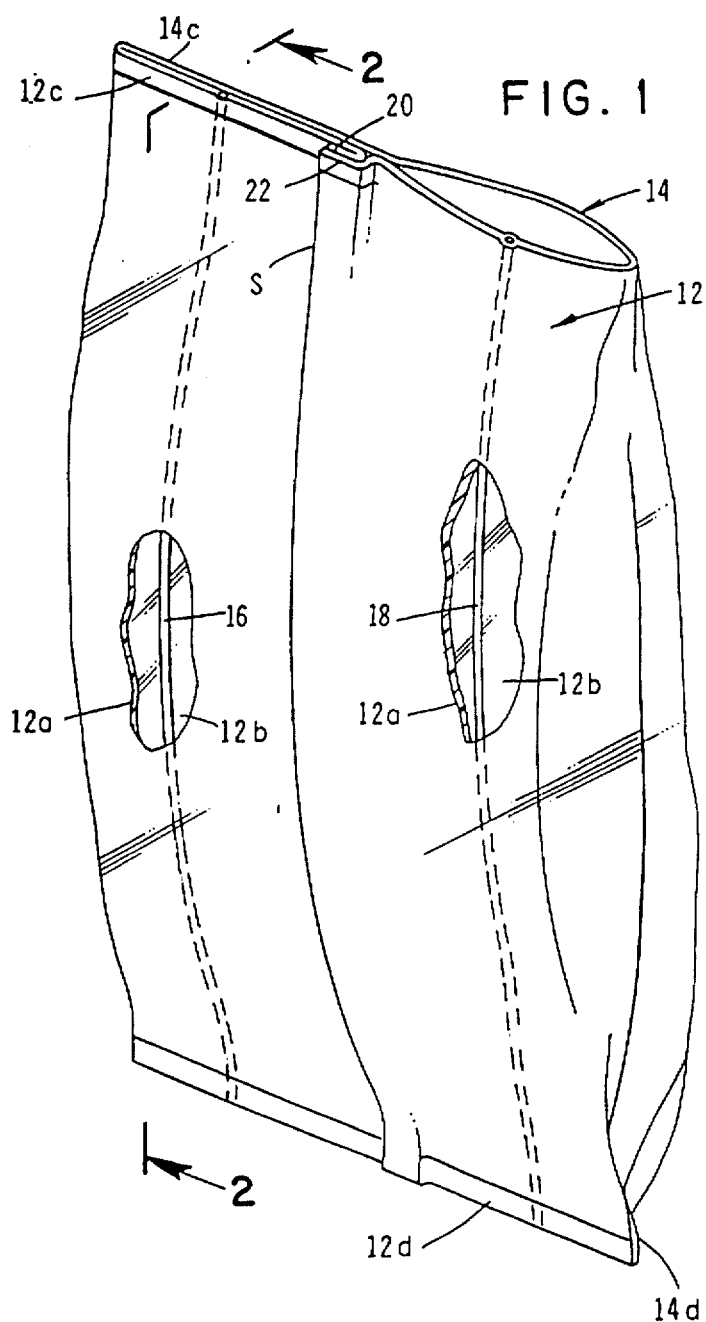
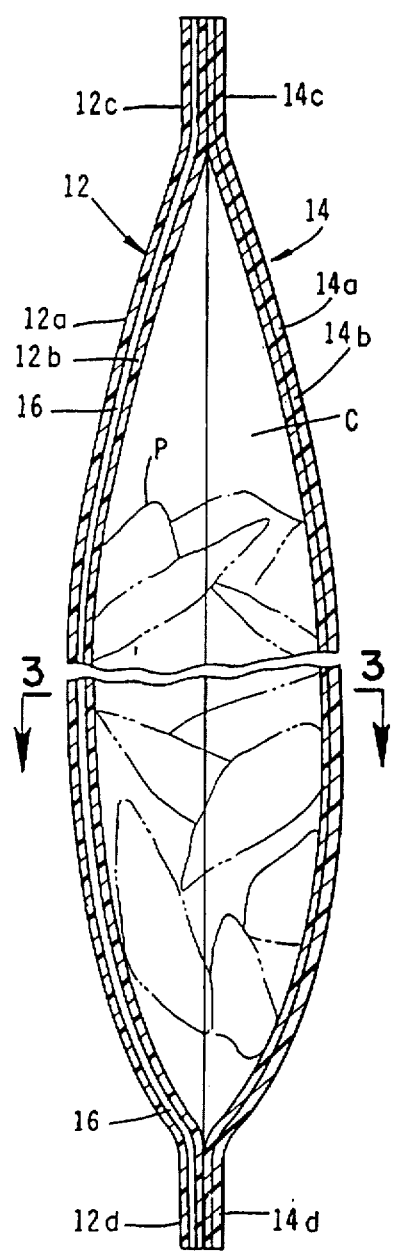
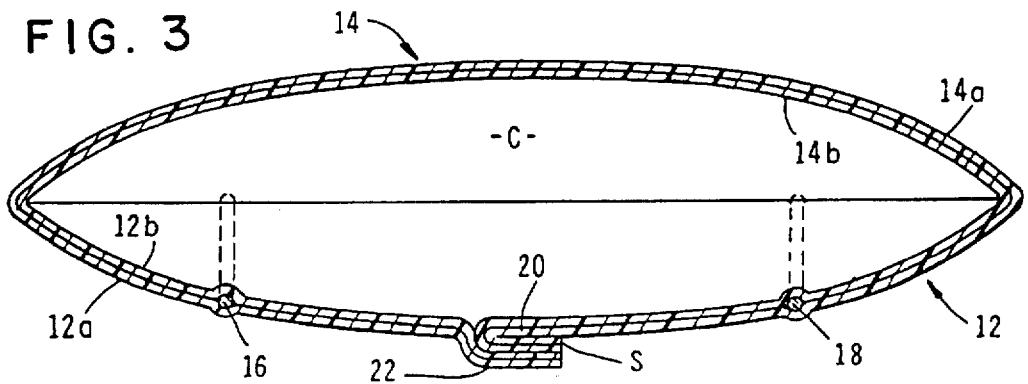

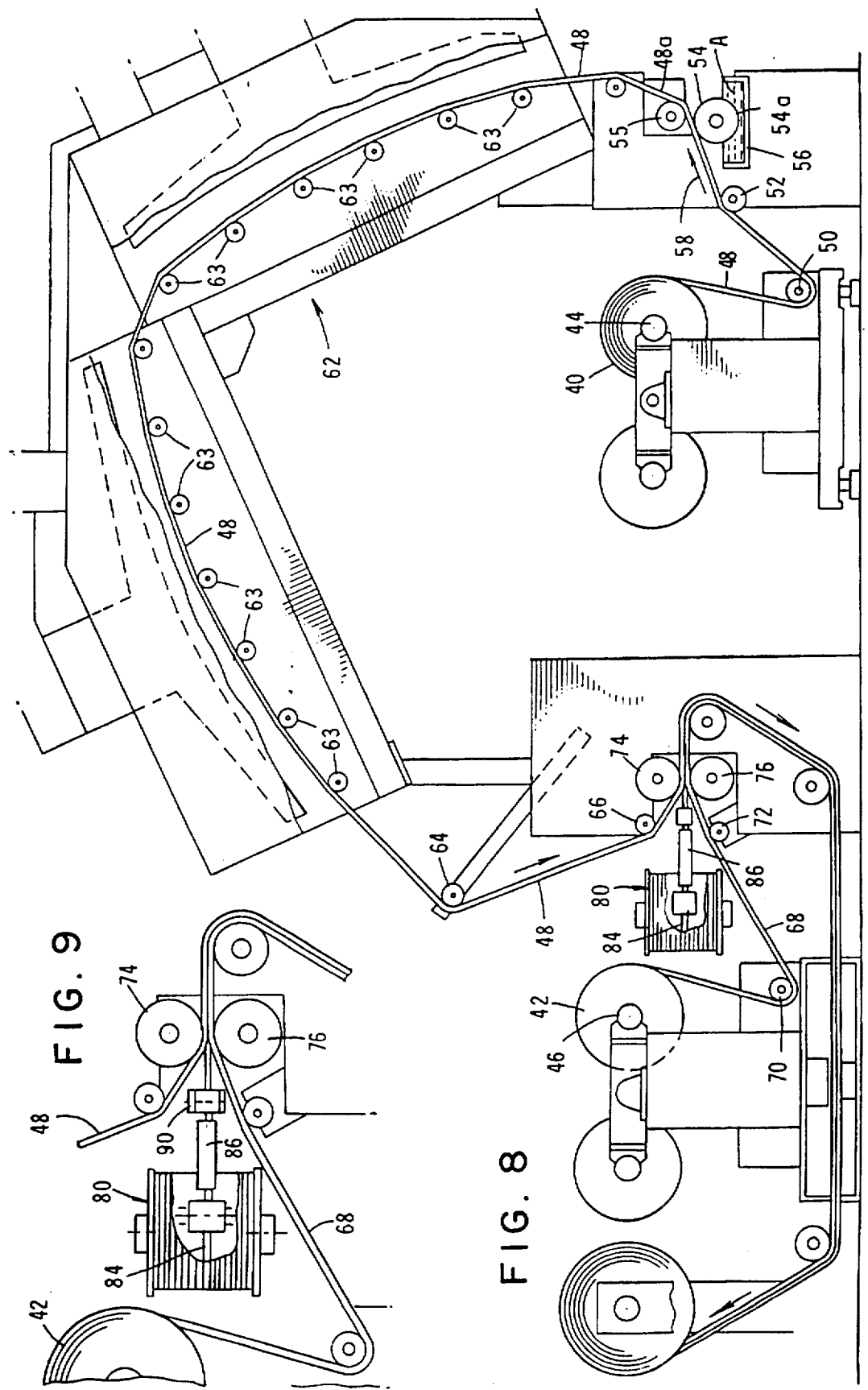

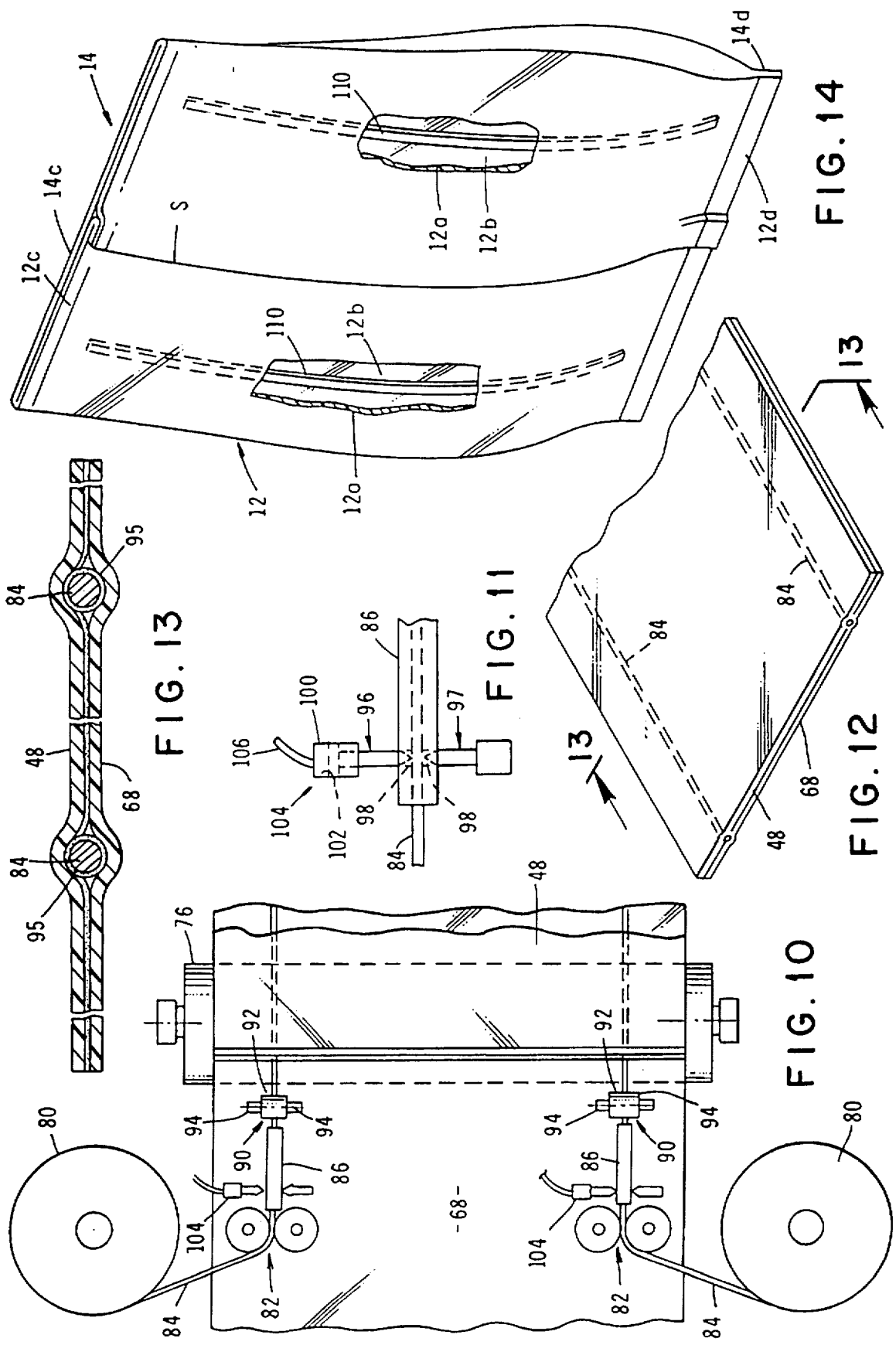

CLOSABLE BAG AND METHOD OF MAKING SAME

BACKGROUND OF THE INVENTION

This is a Divisional Application of application Ser. No. 08/198,601, filed Feb. 18, 1994, now abandoned.

FIELD OF THE INVENTION

The present invention relates generally to closable bags. More particularly, the invention concerns the method of making a laminate within which spaced apart, elongated, matable metal strips have been encapsulated. The laminate is then folded to create a tubular like construction which is sealed at either end to form a reclosable bag for containing food products and other articles.

DISCUSSION OF THE INVENTION

In recent years, plastic bags have become very popular for use in the food industry to contain various types of food products such as chips, crackers, cookies, candy, coffee and the like. Frequently the bags are constructed from thin transparent sheets of cellophane and like materials. When the bags are to be printed, a laminate construction is often used with the printing being done on the inner surface of one of the two laminates. With this construction, the printing is viewed from the exposed side of the printed laminate with the printing ink being disposed against the inner wall of the second laminate. In this way, the printing ink is protected from damage and is prevented from coming in contact with the food articles contained within the bag.

Access to the articles within the bag is obtained by tearing the seal formed at the top of the bag and reaching into the article containing inner chamber. However, because of the inherent nature of the cellophane like material from which the bag is constructed, the bag having once been opened cannot easily be closed. If the user attempts to roll the top of the bag to close the opening, the memory in the cellophane like material will cause the bag to unroll once more exposing the articles contained there within. Because the reclosing problem is so aggravating and so frustrating, a number of clip like closure devices have been devised to clamp the folded opening of the bag so as to maintain the bag in a closed configuration. These clips are typically large, cumbersome and difficult to use and, in some instances, are simply not available.

The thrust of the present invention is directed toward the solution of the annoying problem of how to easily and effectively close cellophane like bags after they have been opened. As will become better understood from the discussion which follows, the present invention solves this problem in an elegant manner by encapsulating between the layers of the film which make up the side walls of the bag, thin lengths of malleable metal strips or wires which enable the upper portion of the bag to be conveniently rolled upon itself in a manner to securely seal the opening therein.

In the past, it has been suggested that lengths of malleable wire be taped, or otherwise affixed to the walls of paper bags to enable the top portion of the bag to be rolled downwardly to close the top opening in the bag. However, the significant costs and difficulties associates with the large scale production of such bags prevented them from coming into wide use. Further, because the wires and the tape which secured them to the walls of the bag were exposed to the interior of the bag, sanitation problems strongly mitigated against the use of such bags in the packaging of food products. Exemplary of such prior art constructions are those disclosed in U.S. Pat. No. 907,492, issued to T. T. Graser; U.S. Pat. No. 1,903,839, issued to T. M. Royal; and U.S. Pat. No. 3,201,030 issued to S. Pollack.

The articles of the present invention and the methods of their manufacture uniquely overcome the drawbacks of the prior art by providing, for the first time, state of the art, laminate bags suitable for a variety of uses, including use in the food industry. The reclosable bags of the invention are easily reclosable without the use of clips or other mechanical devices. Additionally, the novel methods of the invention, make possible the very large scale production of such bags at costs only slightly greater than the costs of laminate bags presently in wide use. Additionally, because the malleable wire or metal strips which uniquely permit reclosure of the bag are encapsulated between the laminates which made up the side walls of the bags, the articles contained within the bags can never come into contact with the bendable strips, thereby completely obviating the possible sanitation problems which plagued the prior art devices.

SUMMARY OF THE INVENTION

It is an object of the present invention to provide a reclosable plastic bag and the method of making the same which can be used for sealably packaging a wide variety of articles, including food products. After the bag is opened, it can quickly and easily be closed by rolling the open end downwardly upon itself in a manner to deform inelastic, malleable metal strips which are securely encapsulated within at least one side wall of the bag.

It is another object of the invention to provide a novel method of making continuous rolls of a thin laminate material that is ideally suited for the large scale production of the reclosable bags. The laminate construction produced by the method of the invention comprises first and second thin layers of film between which one or more lengths of thin malleable metal strips or wires are sealably encapsulated.

Another object of the invention is to provide a method of the character described in the preceding paragraph in which the laminate construction is such that it can readily be cut, folded, filled with product and then sealed at either end to form a completely sanitary, sealed package that can be easily reclosed after once having been opened.

Another object of the invention is to provide a reclosable bag of the character described which is of simple construction, is easy to use and one which can be manufactured in large volume at a very low cost.

DESCRIPTION OF THE DRAWINGS

FIG. 1 is a generally perspective view of one form of the reclosable container of the present invention partly broken away to show internal construction.

FIG. 2 is a cross-sectional view taken along lines 2—2 of FIG. 1.

FIG. 3 is a cross-sectional view taken along lines 3—3 of FIG. 2.

FIG. 8 is a side elevational, diagrammatic view of one form of the apparatus of the invention for forming rolls of thin laminate composites which are made up of thin films between which is encapsulated one of more filaments of a malleable, inelastic material such as a soft metal wire.

FIG. 9 is a fragmentary side-elevational, diagrammatic view of the filament feeding mechanism of the invention.

FIG. 10 is an enlarged fragmentary plan view of the filament-feeding mechanism of the invention.

FIG. 11 is a fragmentary, generally diagrammatic view of the filament cutting mechanism of the apparatus of the invention.

FIG. 12 is a generally perspective, fragmentary view of a portion of one form of the laminate composite formed by the apparatus illustrated in FIGS. 8, 9 and 10.

FIG. 13 is a greatly enlarged cross-sectional view taken along lines 13—13 of FIG. 12.

FIG. 14 is a generally perspective view of yet another form of reclosable container of the present invention.

DESCRIPTION OF THE INVENTION

Figure 4:
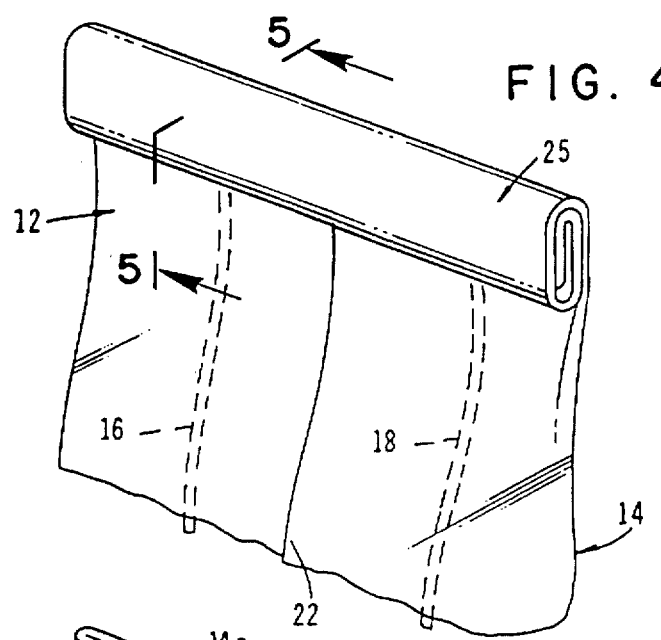
FIG. 4 is a fragmentary perspective view illustrating the container of FIG. 1 in a top folded, closed configuration.
Figure 5:
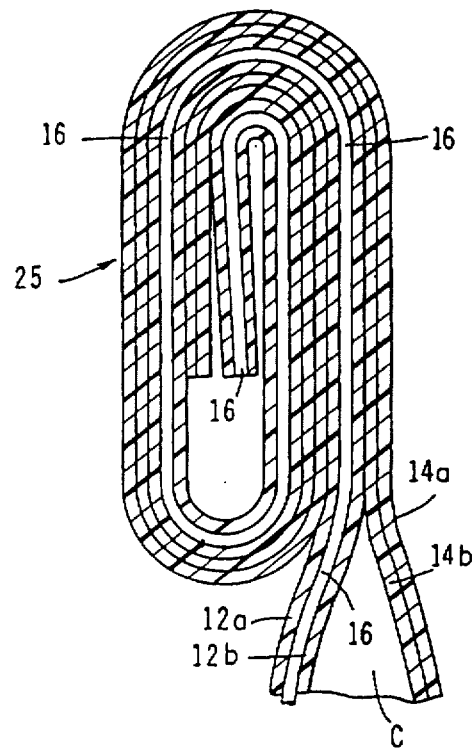
FIG. 5 is an enlarged cross-sectional view taken along lines 5—5 of FIG. 4.

Referring to the drawings and particularly to FIGS. 1 through 5, one embodiment of the easily reclosable container of the present invention is there illustrated. The container of this form of the invention comprises a pair of oppositely disposed walls 12 and 14, each of which comprises a laminate made up of first and second thin, flexible films. The films that make up the walls are designated in the drawings by the numerals 12a, 12b, 14a, and 14b. As best seen in FIG. 2, the laminate walls have top and bottom marginal portions 12c and 12d and 14c and 14d respectively. Disposed intermediate films 12a and 12b are transversely spaced-apart first and second lengths of inelastic malleable material shown here as lengths of soft wire 16 and 18 respectively (FIG. 1). In a manner presently to be described, lengths of wire 16, 18 are sealably encapsulated between thin films 12a and 12b (FIG. 3).

In this first embodiment of the invention, wires 16 and 18 extend the full length of walls 12 and 14. In other forms of the invention, wires 16 and 18 or other similar inelastic, malleable filament, are shorter in length and extend only partially the length of the opposing wall of the container.

In accordance with one form of the method of the present invention, the reclosable container is constructed from a laminate composite that is produced in a long continuous length. In constructing the container, the laminate composite is appropriately cut into lengths substantially equal to the desired height of the reclosable container, and the edge portions 20 and 22 of the laminate are overlapped to form a longitudinally extending seam "S" of the character shown in FIGS. 1 and 2. The edge portions are then bonded together to form a tube-like construction which is open at its top and bottom. One of the openings, as, for example, the bottom opening is then closed and the bottom portions 12d and 14d of the side walls are bonded together in a manner to effectively seal the bottom portion of the container. The articles to be stored within the container, such as potato chips "P" (FIG. 2), are then placed into the interior chamber "C" of the container and the top portion of the container is sealed along marginal portions 12c and 14c. When the laminate composite is formed from heat sealable plastic films, the top and bottom portions can be heat sealed. When the laminate composite is formed from paper or another material, the top and bottom portions can be sealed by an appropriate adhesive.

When it is desired to gain access to the articles contained within internal chamber "C", the seal interconnecting portions 12c and 14c, is broken to open the top portion of the chamber in the manner shown in the right-hand portion of the container as illustrated in FIG. 1. When it is desired to then reclose the open top of the container, portions 12c and 14c are brought into close proximity and the upper portions of the walls of the container are rolled downwardly upon themselves in the manner illustrated in FIGS. 4 and 5. Because wires 16 and 18 are selected from a soft, malleable metal which is capable of being bent manually and of retaining the bent shape after being bent, the top roll 25 of the container will remain in the rolled configuration shown in FIGS. 4 and 5 thereby effectively reclosing chamber "C". At such time that it is desired to once again gain access to chamber "C", roll 25 can be easily unrolled into the starting configuration thereby enabling access to the internal chamber. Because of the inelastic character of wires 16, 18, once they are restraightened, they will tend to hold walls 12 and 14 in an upright configuration thereby simplifying access to chamber "C".

Figure 7:
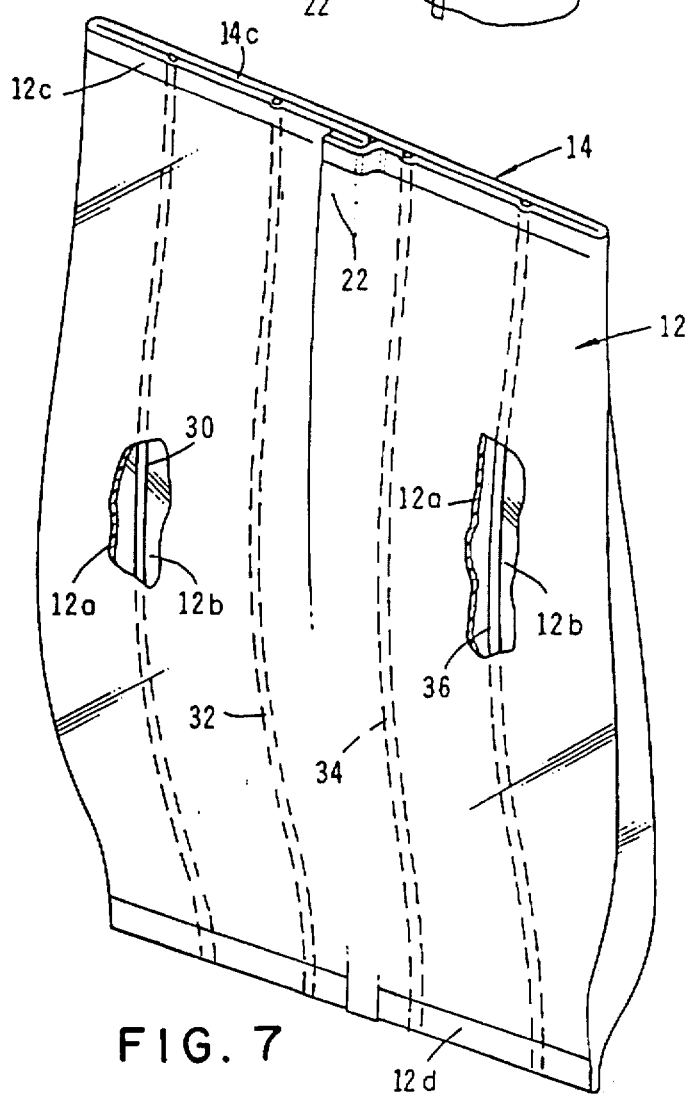
FIG. 7 is a generally perspective view of another form of the reclosable container of the present invention partly broken away to show internal construction.
Figure 6:
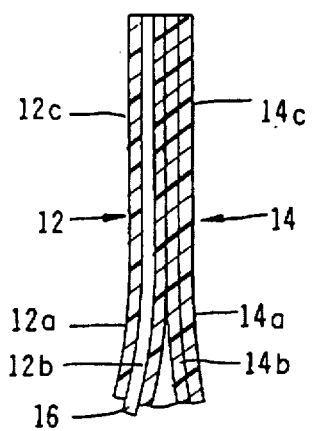
FIG. 6 is an enlarged fragmentary, cross-sectional view of the top portion of the foldable container in a sealed configuration prior to being opened.

Turning now to FIG. 7, another form of the reclosable container of the present invention is there illustrated. This container is of similar construction to the container described in the preceding paragraphs and like numbers are used to designate like components. The major difference between the container shown in FIG. 7 and that shown in FIG. 1 resides in the fact that four lengths of inelastic malleable wire 30, 32, 34, and 36 have been encapsulated between films 12a and 12b. Wires 30, 32, 34, and 36, like wires 16 and 18, are transversely spaced and are preferably constructed of a soft, wire such as soft aluminum, copper or steel which can be bent manually and then, after being bent, retain its shape to enable the opened bag to be easily reclosed in the manner previously discussed and in the manner illustrated in FIGS. 4 and 5.

It is to be appreciated that because the malleable filaments or wires of the laminate composite are sealably encapsulated between thin films 12a and 12b which make up wall 12., the food products or other articles contained within chamber "C" are at all times isolated from the wires or filaments thereby eliminating any possibility of contamination of the articles contained within chamber "C" through contact with the filaments.

The flexible films which make up the laminate composites of the invention can comprise a wide variety of materials of varying thickness, including heat sealable plastic films selected from the group consisting of cellophane, polypropylene, polyethylene, polyester, and like plastic materials. The films can also be constructed from paper, foils of various kinds, and any number of natural and synthetic composite materials. When the films comprise paper or other fibrous materials, thin film membranes of various types can be encapsulated between the layers that make up the composites. Similarly, the films of the laminate composite can be treated in various ways to make them waterproof or to provide other desirable characteristics to the materials.

Turning now to FIGS. 8, 9, 10, and 11, one form of the apparatus of the invention for making continuous rolls of the laminate composite is there illustrated. In the preferred form of the method of the invention, the laminate composite used to construct the reclosable containers is constructed from thin film materials which have been rolled on to first and second supply rolls 40 and 42 (FIG. 8). As previously mentioned, the films can be of varying thickness, but preferably are on the order of between about 0.0003 inch and 0.005 inch. Rolls 40 and 42 are suitably mounted on rotatable rollers 44 and 46 respectively so that lengths of the thin film material can be easily unrolled from the rolls during formation of the laminate composite. More particularly, the first thin film 48, which is rolled on roll 40, is continuously removed therefrom by a first means which includes idler rollers 50 and 52 that function to guide the travel of film 48 toward the film adhesive applicator means of the invention. The film adhesive applicator means here comprises first and second rotatably mounted cooperating rollers 54 and 55 between which the thin film travels. Roller 54 includes a peripheral, adhesive pick-up surface 54a which continually rotates within a reservoir 56 that contains an appropriate liquid adhesive "A". During the adhesive application step, the thin film 48, which is traveling in the direction of the arrow 58 of FIG. 8, passes between rollers 54 and 55 in a manner such that a thin film of the adhesive "A" is uniformly spread over the lower surface 48a of the thin film. Rollers 54 and 55 as well as adhesive reservoir 56 are of a conventional construction well understood by those skilled in the art.

After passing through rollers 54 and 55, the adhesive coated film is drawn through drying means shown here as a large drying oven 62, which is superimposed over roll 40. Drying chamber 62, which is also of standard construction, is adapted to circulate air at elevated temperatures over the adhesive coated surface of the membrane or film 48 as the film passes over accurately spaced idler rollers 63 so as to partially cure the adhesive and render it slightly tacky for later bonding with the second thin film which is removed from roll 42. Either electric heating panels, ultra violet lamps or natural gas fired heaters of conventional construction can be used to heat the air that is circulated over the adhesive coated surface of the film as the film travels through the drying means. Once again, drying chamber 62 is of a character well known to those skilled in the film lamination art.

After the adhesive "A" is suitably cured, the membrane passes around idler rollers 64 and 66 and travels toward the bonding means of the apparatus which functions to bond together the first film 48 and the second film 68. As indicated in FIG. 8, as film 48 moves progressively toward the bonding means, thin film 68 is unrolled from roll 42 and, after passing around idler rollers 70 and 72, also travels toward the bonding means where it is brought into close proximity with film 48. The bonding means of the invention here comprises a pair of rotatably mounted compression rollers 74 and 76 which continuously urge the adhesive coated surface 48a of film 48 into pressural engagement with film 68 so as to securely bond the two films together to form the laminate construction.

An extremely important aspect of the apparatus of the present invention is the feed means which functions to insert at least one filament of an inelastic, malleable material between films 48 and 68 immediately prior to the films passing between compression rollers 74 and 76. As best seen by referring to FIGS. 9 and 10, inelastic, the malleable material, here shown as a soft malleable wire, of between about 12 gauge and 32 gauge, is initially wound upon spaced apart reels 80 which are mounted on either side of compression rollers 74 and 76. The feed means, here provided in the form of a pair of electrically powered filament feeding rollers 82, controllable unwind the malleable wire 84 from reels 80 and direct it toward novel guide means, shown here as elongated guide tubes 86. Guide tubes 86, which are mounted proximate rollers 74 and 76, function to controllably guide the wire in a direction toward compression rollers 74 and 76 for introduction therebetween at predetermined, transversely spaced locations. Tubes 86 of relatively small diameter so as that the soft wire is constrained in a generally linear configuration as it travels toward the filament adhesive applying means of the invention. The filament adhesive applying means functions to uniformly coat the filaments, or wires 84, with a suitable adhesive prior to the filaments being introduced between thin films 48 and 68. Experience has shown that by coating the wires with an appropriate adhesive, the wires will remain securely in position within the laminate even after the laminate has been folded repeatedly. The filament adhesive applying means are here provided as a pair of adhesive applying units 90 each of which includes an adhesive containing chamber 92 and oppositely disposed wire engaging applicators 94 which uniformly apply the adhesive to the wires as the wire travels toward compression rollers 74 and 76. Applicators 94 can comprise rollers, or wick-like members, which draw the adhesive from the chamber 92 and continuously apply it to the wires. Alternatively, applicators 94 can comprise spray units which function to spray the adhesive on the wires as they travel forwardly of the apparatus.

Normally, wires 84 are continuously unwound from rolls 80 and fed through guide tubes 86 and rollers 74 and 76 to form a laminate composite of the character shown in FIGS. 12 and 13 wherein the wires 84 extend continuously between the thin films 48 and 68 with the wires being secured in place by the adhesive 95. However, in certain instances the wires are cut into discrete lengths by cutting means which are mounted adjacent guide tubes 86. As best seen in FIG. 11, the cutting means here comprise a pair of opposing cutters 96 and 97 which extend through opposing apertures 98 provided in guide tube 86. Cutter 96 is connected to a piston 100 which reciprocates within a hydraulic cylinder 102 of a hydraulically operated unit 104. During the wire-cutting operation, hydraulic fluid, which is introduced into cylinder 102 via hydraulic line 106, forces piston 102 inwardly causing the cutting extremity of cutter 96 to move into engagement with the wire 84 and, in cooperation with fixed cutter 97, cleanly cuts the wire at predetermined locations. Additionally, the wire can be cut using rotary knives, the construction and operation of which is well known in the art. Further, cutters 96 and 97 can be operated by electrically operated solenoids.

When the cutting means of the invention is used, the cutting operation is carefully sequenced so that discrete segments of wire of precise length will be fed sequentially toward rolls 74 and 76 for encapsulation between films 48 and 68 at predetermined, longitudinally, spaced-apart locations. More particularly, the introduction of the discrete wire segments between rollers 74 and 76 is carefully timed so that the laminate composite will be formed evenly with spaced-apart transverse bands that have no wires extending therethrough. During construction of the closable containers of the invention from such a laminate composite, the laminate is carefully cut at the location of these bands. The section of laminate is then folded and sealed at the top and bottom portions thereof through which the wires do not extend.

Turning now to FIGS. 14 through 18, there is illustrated an alternate form of the reclosable container of the present invention and one form of an apparatus for making the container. Once again, the reclosable container shown in FIG. 14 is of similar construction to that shown in FIG. 1 and like numerals have been used to identify like components. The principal differences between the reclosable container shown in FIG. 14 and that shown in FIG. 1 resides in the fact that the inelastic, malleable material, which is encapsulated between the first and second thin films, is provided in the form of thin strips 110 which are generally rectangular in cross section. Additionally, strips 110 are discrete strips which are shorter in length than the distance between top and bottom of the reclosable container. With this construction, when the container is sealed along the top and bottom portions thereof, strips 110 will not extend into the sealed areas permitting walls 12 and 14 to be directly bonded together without the strips extending into the bonding areas.

Strips 110 can be constructed from a wide variety of materials, including soft aluminum, copper, steel and various malleable, inelastic synthetics which can be easily manually bent and which will retain their bent shape after bending. The strips can be of varying widths and thicknesses depending upon the application to be made of the reclosable container. However, for containers such as those used to contain potato chips and like food articles, strips 110 preferably have a thickness of on the order of 0.010 inch and a width of on the order of 0.100 inch. Where more than two stips are used in the construction of a container, smaller strips can be used and still permit efficient reclosing of the container.

Figure 15:
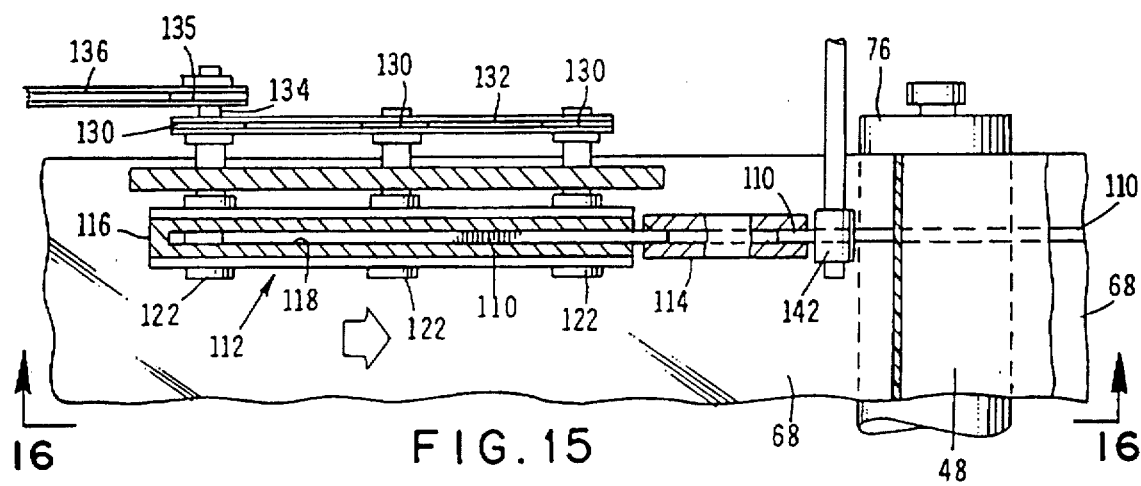
FIG. 15 is a top plan view partly in cross-section of a malleable strand feeding mechanism used in an alternate embodiment of the apparatus of the present invention.
Figure 16:
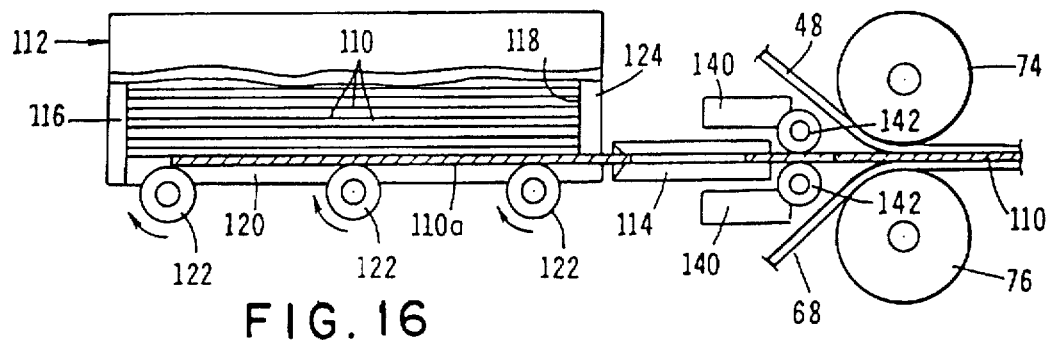
FIG. 16 is a view taken along lines 16—16 of FIG. 15.
Figure 18:
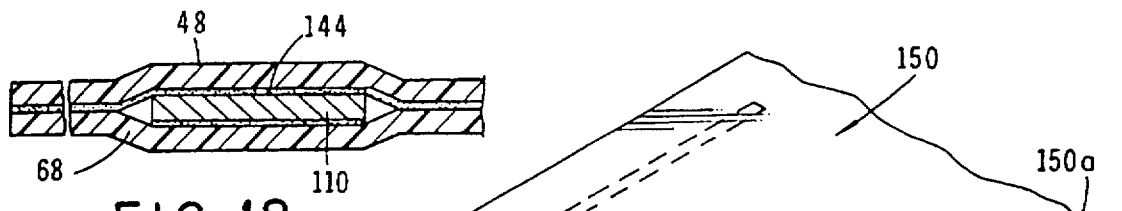
FIG. 18 is an enlarged, cross-sectional view taken along lines 18—18 of FIG. 17.
Figure 17:
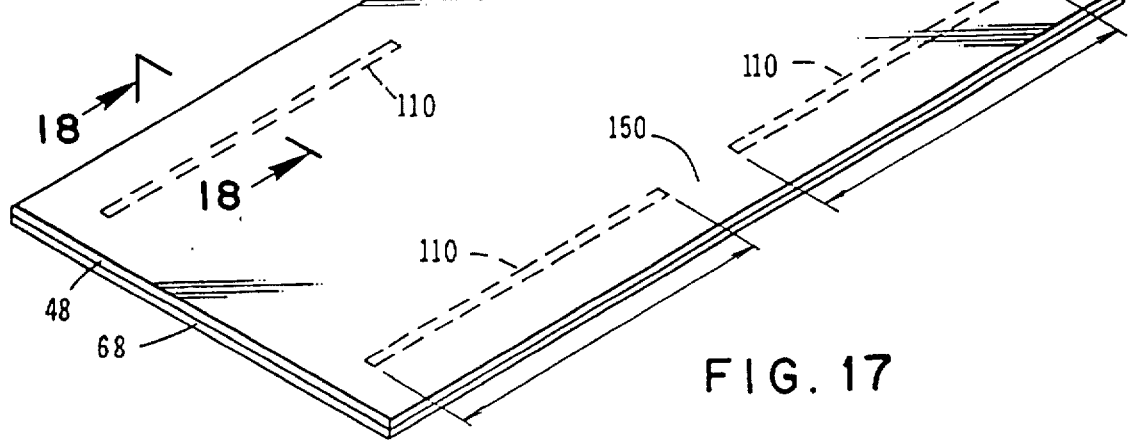
FIG. 17 is a generally perspective view of a portion of yet another form of thin film laminate composite of the present invention.

Turning now to FIGS. 15 and 16, the apparatus for making the continuous laminate composite of this form of the invention is there shown. This apparatus is similar in many respects to the apparatus shown in FIG. 8 save that the feed means for introducing the wire between compression rollers 74 and 76 is of a totally different character. More particularly, the feed means of this form of the invention is adapted to sequentially feed the individual malleable strips 110 toward the cooperating rollers 74 and 76. The feed means here comprises a hopper assembly 112 which is mounted proximate guide means which are of a slightly different construction comprising a pair of guide rollers 114 that are mounted proximate rollers 74 and 76. Hopper assembly 112 comprises a hopper 116 having an internal chamber 118 within which a plurality of strips 110 can be stacked one on top of the other in the manner illustrated in FIG. 16. Chamber 118 is a length slightly greater than length of strips 110 so that the strips can be conveniently placed into the chamber. Extending through the bottom wall 120 of each of the hoppers, are a plurality of feed rollers 122 which function to engage the lower most strip (identified as 110a) and to urge it in a forwardly direction through the apertured front wall 124 of the hopper and then into one of the guide tubes 114. As best seen in FIG. 15, each set of drive rollers 122 are suitably interconnected with drive means for controllably rotating the feed rollers. The drive means of each hopper assembly is here provided in the form of a plurality of sheaves 130 which are interconnected by a drive belt 132. One of the sheaves 130 is, in turn, a driven sheave which is interconnected with a driving sheave 132 by means of a connector shaft 134. Driving sheave 132 is driven by motor means (not shown) which is interconnected with the drive sheave by means of a drive belt 136. The drive means of each hopper assembly is intermittently driven so as to sequentially introduce the strips 110 into the guide tubes and then between adhesive applying means, the character of which will presently be described. After passing through the adhesive applying means, strips 110 pass between rollers 74 and 76 in a manner such that the strips will be encapsulated within the composite laminate at spaced-apart locations such as shown in FIG. 17.

An adhesive applying means is associated with each hopper assembly and, in this form of the invention, comprises a pair of adhesive containing reservoirs 140 which are in communication with a pair of oppositely disposed adhesive applying rollers 142. With this construction, as the malleable strips 110 pass between rollers 142, the adhesive coated, opposing surfaces of rollers 142 evenly spread an adhesive 144 onto the malleable strips so that the strips will be securely adhesively bonded to thin films 48 and 68 in the manner shown in FIG. 18. As before, after the strips 110 are coated with the adhesive 144, the strips pass between films 48 and 68 and then between rollers 74 and 76 which function to adhesively bond together the thin films and the malleable strips in a manner to form a continuous length of laminate composite of the character shown in FIG. 17 and generally designated by the numeral 150.

In making reclosable containers from laminate 150, the laminate is first cut along bands 150 which are located intermediate metal strips 110 and then are folded and sealed in the manner previously described to construct sealable containers of the character shown in FIG. 14. These types of containers, like the container shown in FIG. 1, after having been opened, can be reclosed by rolling the top portion of the container downwardly upon itself in the manner shown in FIGS. 4 and 5 to manually bend strips 110 in a manner to secure the container in a closed configuration of the character shown in FIGS. 4 and 5.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of making a reclosable bag from a length of laminate composite formed from a first roll of thin film, a second roll of a thin film and a filament of inelastic, malleable material, said method comprising the steps of:

(a) removing the length of thin film from the first roll;

(b) removing a length of the film from the second roll;

(c) bringing said lengths of thin film into close proximity;

(d) inserting the filament of inelastic malleable material between said lengths of thin film; and (e) bonding together said first and second lengths of thin film to form a laminate composite in a manner to sealably encapsulate the filament of inelastic, malleable material between said lengths of thin film;

(f) cutting said laminate composite into discrete lengths to form a plurality of bag forming lengths each having a top portion, bottom portion and first and second side portions; and (g) interconnecting said first and second side portions of each said bag forming length to form a tube-like construction having a bottom opening and sealing said bottom opening to form a bag.

2. A method as defined in claim 1, including the further step of applying an adhesive to the filament prior to inserting the filament between said lengths of thin film.

3. A method as defined in claim 1, including the further step of cutting the filament of inelastic, malleable material into discrete lengths prior to the insertion thereof between said lengths of thin film.

4. The method as defined in claim 1 in which the thin film on the first and second rolls thin film is selected from the group consisting of cellophane, polypropylene, polyethylene and polyester.

5. The method as defined in claim 4 in which the thin film on the first and second rolls of thin film has a thickness of between 0.0003 inch and 0.005 inch.

6. A method of making a bag from a web of thin laminate composite comprising the steps of:
   (a) removing a first length of material from a first roll of a heat-sealable, thin plastic film;
   (b) removing a second length of material from a second roll of heat-sealable, thin plastic film;
   (c) applying an adhesive to one surface of a selected one of said first and second lengths of material to form an adhesive coated surface;
   (d) inserting a filament of malleable metal between said first and second lengths;
   (e) bringing said adhesive coated surface of said selected one of said first and second lengths into pressural engagement with said filament of malleable metal and into engagement with the other of said first and second lengths in a manner such that said filament of malleable metal is sealably encapsulated between said first and second lengths to form a laminate composite;
   (f) in cutting said laminate composite into discrete lengths to form a plurality of bag forming lengths each having a top portion, a bottom portion and first and second side portions; and
   (g) connecting together said first and second side portions of each said bag forming length to form a tube-like construction having an opening and sealing said opening to form an internal article receiving chamber.

7. A method as defined in claim 6, including the further step of applying an adhesive to said filament of malleable metal prior to inserting said filament between said first and second lengths.

8. A method as defined in claim 6 including the further step of cutting the filament of malleable metal into discrete lengths prior to inserting said filament between said first and second lengths.

9. The method as defined in claim 6 in which said first and second lengths have thicknesses of between 0.0005 inch and 0.005 inch.

10. The method as defined in claim 9 in which said plastic film on said first and second rolls is selected from the group consisting of cellophane, polypropylene, polyethylene and polyester.

11. The method as defined in claim 10 in which said plastic film on said first and second rolls is of the same material.

12. The method as defined in claim 10 in which said plastic film on said first and second rolls is of a different material.

13. The method as defined in claim 12 in which said plastic film on said first roll comprises polypropylene and said plastic film on said second roll comprises polyester.

14. A method of making a reclosable bag comprising the steps of:
   (a) removing a first length of material from a first roll of a heat-sealable, thin plastic film;
   (b) removing a second length of material from a second roll of a heat-sealable, thin plastic film;
   (c) applying an adhesive to one surface of a selected one of said first and second lengths of material to form an adhesive coated surface;
   (d) inserting a filament of malleable material between said first and second lengths;
   (e) bringing said adhesive coated surface of said selected one of said first and second lengths into pressural engagement with said filament of malleable material and into engagement with the other of said first and second lengths in a manner such that said filament of malleable material is sealably encapsulated between said first and second lengths to form a laminate composite;
   (f) cutting said laminate composite into discrete lengths to form a plurality of bag forming lengths each having a top portion, a bottom portion and first and second side portions;
   (g) overlapping said first and second side portions to form a seam;
   (h) bonding together said first and second side portions along said seam to form a tube-like construction having top and bottom openings; and
   (i) sealably closing one of said top and bottom openings to form an interior article receiving chamber.

15. A method as defined in claim 14 including the step of inserting two spaced-apart filaments of malleable material between said first and second lengths.

16. A method as defined in claim 15 including the further step of applying an adhesive to said spaced-apart filaments of malleable material before inserting said filament between said first and second lengths.

17. A method as defined in claim 15 including the further step of cutting said filaments of malleable material into discrete lengths prior to inserting said filaments between said first and second lengths.

18. A method as defined in claim 15 in which said strands comprise an inelastic, malleable metal capable of being bent manually and of retaining the bent shape after being bent.

19. A method as defined in claim 15 in which said plastic film on said first and second rolls has a thickness less than 0.005 inch.

* * * * *